United States Patent [19]

Dotzauer et al.

[11] Patent Number: 4,587,278

[45] Date of Patent: May 6, 1986

[54] SOUND-INSULATING BOARDS BASED ON MINERAL FIBERS AND THERMOPLASTIC BINDERS

[75] Inventors: Bernhard Dotzauer, Maxdorf; Hans Kast, Mannheim; Gernot Franzmann, Bobenheim; Gregor Ley, Wattenheim; Wilhelm F. Beckerle, Bobenheim-Roxheim; Wolfgang Schilder, Dirmstein, all of Fed. Rep. of Germany

[73] Assignee: BASF Aktiengesellschaft, Ludwigshafen, Fed. Rep. of Germany

[21] Appl. No.: 599,575

[22] Filed: Apr. 12, 1984

[51] Int. Cl.[4] ............... C08K 7/12; C08K 7/10; C08K 9/02
[52] U.S. Cl. .................. 523/200; 523/209; 523/216; 523/217; 523/222; 524/442; 524/444; 524/448; 524/452; 524/560; 524/561
[58] Field of Search ............... 523/222, 217, 209, 200, 523/216; 524/442, 444, 448, 452, 560, 561

[56] References Cited

U.S. PATENT DOCUMENTS 4,433,020  2/1984  Narukawa et al. ............... 428/408

Primary Examiner—Herbert J. Lilling
Attorney, Agent, or Firm—Oblon, Fisher, Spivak, McClelland & Maier

[57] ABSTRACT

Sound-insulating boards which are based on mineral fibers and thermoplastic binders and may or may not additionally contain fillers, flameproofing agents and water repellants contain, as the binder, from 4 to 20%, based on the weight of the mineral fibers, of polymers having a glass transition temperature of from 30° to 80° C. and consisting of not less than 60% by weight, based on the copolymer, of (meth)acrylates of 1 to 4 carbon atoms and as much as 40% by weight of acrylonitrile and/or styrene.

11 Claims, No Drawings

SOUND-INSULATING BOARDS BASED ON MINERAL FIBERS AND THERMOPLASTIC BINDERS

Sound-insulating boards based on mineral fibers and binders as well as, in general, fillers, flameproofing agents and water repellants are produced in large amounts industrially. The binder predominantly used is starch, this being employed in amounts as high as about 15%, based on the mineral fibers. The fillers employed are generally finely divided clays, eg. kaolin, and the mineral fibers used are rock wool and/or glass fibers, generally having a length of from 5 to 50 mm and a thickness of about 1.7–3.3 dtex. The amount of fillers can vary within wide limits and is frequently from 10 to 30% by weight, based on the mineral fibers. The sound-insulating boards are generally about 1–3 cm thick. The disadvantage of these conventional sound-insulating boards is their moisture sensitivity, which generally makes it necessary to coat or impregnate the back of the boards with, for example, thermosetting plastics, such as aqueous melamine/formaldehyde resins, so that further drying is required. For this reason alone, the production of such plates is relatively energy-consumptive. Moreover, the starch migrates and hence leads to discoloration of decorative coatings, which are usually applied on the front face of the boards.

East German Pat. No. 83,315 discloses that sound-insulating boards have also been produced in which mineral fibers are bonded with cement or gypsum as well as a polyvinyl acetate dispersion with the addition of a bitumen emulsion. The addition of bitumen emulsion is necessary to prevent efflorescence, but it leads to discoloration, and the resulting products have comparatively high densities, low strengths and poor heat-distortion resistance.

In the process described in U.S. Pat. No. 3,779,862, flexible mineral fiber boards are produced by adding an aqueous dispersion of an anionic self-crosslinking polyacrylate, an aluminum hydroxide suspension and a synthetic anionic polyelectrolyte during the preparation of the aqueous suspension of the mineral fibers, the boards then being formed by a dewatering procedure. This somewhat involved process gives boards which are neither self-supporting nor moisture-proof.

Finally, German Laid-Open Application DOS No. 2,545,728 discloses that insulating boards can be produced by binding perlite and rock wool with a polymer dispersion based on a copolymer of butyl acrylate, acrylonitrile and acrylic acid, with the addition of a fiber-digesting agent based on an aqueous solution of a carboxyl-containing polyacrylate. However, this gives insulating boards which provide very good heat insulation but whose compressive strength and flexural tensile strength are unsatisfactory. From the flexural strength of the insulating board given in Example 1 of German Laid-Open Application DOS No. 2,545,728, it is possible to estimate that the binder used was a copolymer having a glass transition temperature below $-20°$ C.

We have found that sound-insulating boards based on mineral fibers and a thermoplastic binder, which may or may not additionally contain fillers, flameproofing agents and water repellants, have particularly advantageous properties if they contain, as the binder, from 4 to 20%, based on the weight of the mineral fibers, of polymers having a glass transition temperature of from $30°$ to $80°$ C. and consisting of from 60 to 100% by weight of (meth)acrylates of 1 to 4 carbon atoms and from 0 to 40% by weight of acrylonitrile and/or styrene, the percentages being based on the copolymer. Sound-insulating boards of this type can be produced in a conventional manner by treating mineral fibers with an anionic dispersion of the said polymer and a precipitating agent in aqueous suspension, separating off the aqueous phase with sheet formation, and drying. In another embodiment of the production process, it is also possible to convert the mineral fibers into sheets and then treat these with an aqueous anionic dispersion of the said polymer and to dry them.

The sound-insulating boards contain the conventional mineral fibers, for example rock wool, basalt wool and/or glass fibers having a length of, in general, from 0.2 to 8, in particular from 0.5 to 5, cm and a thickness of about 1.7–3.3 dtex. Mineral fibers of this type are generally used in the sized state for the production of the sound-insulating boards, the sizing agents employed for such mineral fibers generally being mineral oils and synthetic polymers, in particular polyacrylate dispersions and polyacrylic acids.

The thermoplastic binders, ie. the polymers having a glass transition temperature of from $30°$ to $80°$ C., preferably from $50°$ to $70°$ C., and consisting of from 60 to 100, in particular from 60 to 80, % by weight of methacrylates and/or acrylates of 1 to 4 carbon atoms and from 0 to 40, in particular from 20 to 40, preferably from 30 to 40, % by weight of acrylonitrile and/or styrene, in particular of acrylonitrile, the percentages being based on the polymer, are present in the sound-insulating boards in an amount of from 4 to 20, preferably from 6 to 15, in particular from 8 to 12, % by weight, based on the weight of the mineral fibers. They are derived from, for example, methyl methacrylate, ethyl acrylate, ethyl methacrylate, n-butyl methacrylate, tert.-butyl acrylate and tert.-butyl methacrylate and, if appropriate, minor amounts of n-butyl acrylate and methyl acrylate. The polymer binders can contain, as copolymerized units, as much as 5% of (meth)acrylic acid and/or (meth)acrylamide. In general, they are used, in the production of the sound-insulating boards, in the form of their aqueous anionic dispersions, which are prepared in a conventional manner by emulsion polymerization, using the usual amounts of the conventional anionic and, if required, conventional non-ionic emulsifiers, the usual amounts of the conventional free-radical polymerization initiators being employed. Examples of suitable anionic emulsifiers are alkylsulfonates and sulfated and oxyethylated alkylphenols. Polymer dispersions of this type are available commercially, and are generally in the form of 40–70% strength dispersions.

In the production of the sound-insulating boards, where the mineral fibers are converted to a suspension and binders are added to the aqueous suspension of mineral fibers, the polyacrylate or polymethacrylate dispersions of the stated type can be added as such to the suspension. The binder polymer is then precipitated onto the fibers by means of a precipitating agent, and binds these after the conventional sheet formation, for example on sieves with removal of the aqueous phase. The sheet-forming procedure is followed by drying at elevated temperatures, in general at from $110°$ to $220°$ C., preferably from $140°$ to $180°$ C., and it is possible to use, for example, infrared lamps, hot air or microwaves for the drying procedure. It has proven advantageous to add conventional heat-sensitizing agents before the sheet-forming procedure; these can prevent migration of the polymer particles during the drying process. Examples of suitable heat-sensitizing agents are water-soluble polyacetals as described in British Pat. No. 866,401, oxyalkylated polysiloxanes as described in British Pat. Nos. 1,206,036, 1,178,304 and 1,284,064, and cationic substances as described in British Pat. No. 1,230,640 and Canadian Pat. No. 909,981. Oxyalkylated amines having inverse solubility, as described in British Pat. No. 1,422,873, are particularly advantageous. These amines may be derived from monoamines or polyamines which have in general from 1 to 10, preferably from 1 to 3, amino groups. Particularly important amines are those containing 2 amino groups, and the amino groups of the oxyalkylated amines can be primary, secondary or tertiary. The oxyalkylated amines are preferably derived from aliphatic amines, in particular from aliphatic polyamines, such as ethylenediamine, diethylenetriamine, dipropylenetriamine, triethylenetetramine or tetraethylenepentamine, or from ethanolamine, diethanolamine or triethanolamine, ethylenediamine being particularly important. They may furthermore be derived from, in particular, ethylene oxide and/or propylene oxide. They are used in general in amounts of from 1 to 5% by weight, based on the polymeric binder, and can be added to the polyacrylate dispersion.

In the production of the sound-insulating boards from aqueous suspension, advantageously used precipitating agents are cationic polymer dispersions. Such dispersions contain conventional cationic and, if appropriate, conventional non-ionic emulsifiers, eg. oxyalkylated alkylphenols, oxyalkylated fatty alcohols or oxyalkylated acids, in conventional amounts of about 0.1–2.0% by weight, based on the polymer. Such cationic polymer dispersions are also available commercially. Finally, the precipitating agent used may furthermore be a salt of a polyvalent metal, for example an aluminum salt, in particular aluminum sulfate, the amount of this being in general from 5 to 15, preferably from 8 to 12, % by weight, based on the poly(meth)acrylate present in the anionic poly(meth)acrylate dispersion.

The use of commercial flocculants, such as polyacrylamide, in a conventional manner to flocculate finely divided components of the inorganic additives is frequently advantageous because clear filtrates are obtained in this way.

In bonding of the mineral fibers with the aqueous anionic poly(meth)acrylate dispersion is carried out only after sheet formation, for example by sucking in a foam of this dispersion or spraying it, the polyacrylate dispersion is preferably used in a concentration of from 10 to 50, in particular from 15 to 30, % by weight and preferably contains a heat-sensitizing agent of the above type in the amount stated above. In this embodiment of the process, the mineral fiber boards can be produced in a conventional manner by a dry or wet method. After the mineral fiber boards have been impregnated, they are dried as described above.

The dry sound-insulating boards have a thickness of from 0.5 to 5, generally from 1 to 3, preferably from 1 to 2, cm. They generally contain fillers, such as finely divided clays, eg. kaolin and montmorillonite, feldspar, chalk, kieselguhr and/or mica, in an amount as high as 30, preferably from 10 to 20,% by weight, based on the mineral fibers.

The sound-insulating boards, which generally exhibit very advantageous fire behavior, can additionally contain as much as 10, preferably from 1 to 3, % by weight, based on the mineral fibers, of conventional flameproofing agents, eg. aluminum silicates and hydroxides, borates, such as borax, and/or phosphates, such as primary sodium phosphate. Finally, as much as 5, preferably from 1 to 2, % by weight, based on the mineral fibers, of conventional water repellants, such as silicones (polysiloxanes) and waxes, are generally added in the production of the sound-insulating boards.

The novel sound-insulating boards can be provided, on the side exposed to view, with the conventional sound-absorbing structures, and can be coated in a conventional manner. Materials suitable for this purpose are available commercially, and coatings of this type based on commercial aqueous polymer dispersions may furthermore be colored.

The novel sound-insulating boards possess excellent sound-insulating characteristics, are rigid and do not sag even in a warm moist atmosphere (tropics) or in the wet state. They are flame-retardant, and release water which has already been absorbed, without loss of their functional properties. Surprisingly, the novel sound-insulating boards can be produced in a particularly energy-saving manner by the novel production process, since in this process the removal of water from the compacted boards by evaporation during drying is substantially easier than when starch is used as the binder. Another advantage of the novel production process is that the waste water contains virtually no harmful substances.

In the Examples which follow, parts and percentages are by weight, unless stated otherwise.

EXAMPLES 1 TO 3

The additives shown in the Table below are added in each case to a suspension of 330 parts of rock wool (average fiber length about 3 cm, thickness less than 3.3 dtex) in 5,000 parts of water, after which a 50% strength anionic dispersion of the binder polymer shown in the Table below is introduced in each case, followed by the addition of the amount of precipitating agent stated in the Table, the percentages in each case being based on the amount of rock wool. The components are thoroughly dispersed and the mass is then introduced onto a sieve under reduced pressure, and dewatering is promoted by pressing gently (about 0.1 bar). The material is applied in an amount such that the thickness after pressing is 15 mm. Drying is then carried out for from 2 to 3 hours, and sound-insulating boards having a density of 0.2–0.7 g/cm$^3$ are obtained. Their flexural tensile strengths, measured in accordance with DIN No. 53,423 (width differing, 4 cm), are summarized in the Table below. In this Table, i-BA is isobutyl acrylate, nBA is n-butyl acrylate, tert.BA is tert.-butyl acrylate, AN is acrylonitrile, AS is acrylic acid, MMA is methyl methacrylate, EA is ethyl acrylate, MA is methyl acrylate and S is styrene.

TABLE

| Example No. | Binder polymer Polyacrylate | Glass transition temperature (°C.) | Amount | Additives (based on mineral fibers) | Precipitating agent | Bending test (force at break; DIN 53,423); (N: 4 cm width, 1.5 cm thickness) | Water content before drying (%) | Drying time at 190° C.; time to weight constancy (min) |
|---|---|---|---|---|---|---|---|---|
| 1 | 30 nBA 35 MMA 35 AN | 62 | 8.5% | 15% clay 2% distearyl-diketene | 0.4% Al$_2$(SO$_4$)$_3$ | 63 | 34.6 | 36 |
| 2 | 60 i-Ba 5 MMA 32 AN 3 AS | 42 | 6.0% | 10% kaolin 1.5% distearyl-diketene | 0.4% Al$_2$(SO$_4$)$_3$ | 48 | 37.1 | 37 |
| 3 | 35 nBA 12 FA 18 MMA 35 AN | 38 | 8.0% | 15% kaolin | 0.1% Al$_2$(SO$_4$)$_3$ 4.0% cationic polymer 30 nBA 10 MMA 40 AN 20 N—vinyl-imidazole methosulfate Glass transition temperature 45° C. | 85 | 46.0 | 49 |
| 4 | 25 nBA 15 FA 20 MMA 20 S 20 AN | 54 | 5.0% | 12.5% clay | 5.0% cationic polymer 25 nBA 20 MMA 40 S 5 N—vinyl-imidazole methosulfate glass transition temperature 39° C. | 43 | 45.3 | 53 |
| 5 | 38 i-BA 22 MA 25 S 15 AN | 55 | 20.0% | 5% clay 15% kaolin | 1.5% | 68 | 48.7 | 58 |
| 6 | 25 i-BA 35 MMA 40 AN | 67 | 15.0% | — | — | 79 | 52.9 | 59 |
| 7 | 25 nBA 15 MA 20 MMA 40 AN 20 nBA | 59 | 11.0% | 20% kaolin | 1.1% | 57 | 40.5 | 39 |
| 8 | 30 i-BA 10 MMA 40 AN (obtained by mixing equal amounts of the polymer dispersions with polymers consisting of 40 nBA/60 AN 60 i-BA/20 MMA/20 AN | 48 | 12.0% | 10% kaolin | 1.3% | 84 | 48.0 | 62 |
| Comparative experiment | Potato starch | | 8.3% (determined by loss on igniting: corrected) | 18% kaolin | — | 63 | 58.3 | 105 |

We claim:

1. A sound-insulating board which comprises mineral fibers and a thermoplastic binder, wherein said board contains as the binder from 4 to 20%, based on the weight of the mineral fibers, of a polymer having a glass transition temperature of from 38° to 80° C. and consisting of from 60 to 100% by weight of (meth)acrylates of alkanols of 1 to 4 carbon atoms and from 0 to 40% by weight of acrylonitrile and/or styrene, the percentages being based on the copolymer.

2. The sound-insulating board of claim 1, wherein said board additionally contains fillers.

3. The sound-insulating board of claim 1, wherein said board additionally contains flameproofing agents.

4. The sound-insulating board of claim 1, wherein said board additionally contains water repellants.

5. The sound-insulating board of claim 1, wherein the mineral fibers are rock wool, basalt wool or glass fibers.

6. The sound-insulating board of claim 1, wherein said mineral fibers have a length of about 0.2 to 8 cm and a thickness of about 1.7 to 3.3 dtex.

7. The sound-insulating board of claim 6, wherein the mineral fibers are sized.

8. The sound-insulating board of claim 7, wherein the mineral fibers are sized with mineral oils or synthetic polymers.

9. The sound-insulating board of claim 8, wherein the synthetic polymers are polyacrylate dispersions or polyacrylic acids.

10. The sound-insulating board of claim 1, wherein acrylonitrile and/or styrene is contained in an amount of 20 to 40% by weight.

11. The sound-insulating board of claim 10, wherein the amount of acrylonitrile and/or styrene is 30 to 40% by weight.

* * * * *

UNITED STATES PATENT AND TRADEMARK OFFICE
CERTIFICATE OF CORRECTION

PATENT NO. : 4,587,278

DATED : May 6, 1986

INVENTOR(S) : Dotzauer, Bernhard et al.

It is certified that error appears in the above-identified patent and that said Letters Patent is hereby corrected as shown below:

On the title page insert:

--[30]  Foreign Application Priority Data 33 14 373  Fed. Rep. of Germany  20th April 1983. --

Signed and Sealed this

Twelfth Day of August 1986

[SEAL]

Attest:

DONALD J. QUIGG

Attesting Officer  Commissioner of Patents and Trademarks